United States Patent
Chae et al.

(10) Patent No.: US 9,463,802 B2
(45) Date of Patent: Oct. 11, 2016

(54) CONTROL METHOD FOR SHIFTING IN MANUAL TRANSMISSION VEHICLE

(75) Inventors: Chang Kook Chae, Suwon-si (KR); Heungseok Lee, Seoul (KR); Sukil Oh, Suwon-si (KR); Wan Soo Oh, Yongin-si (KR); Jin Hyun Kim, Seoul (KR); Koo Tae Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 444 days.

(21) Appl. No.: 13/591,972

(22) Filed: Aug. 22, 2012

(65) Prior Publication Data

US 2013/0150213 A1 Jun. 13, 2013

(30) Foreign Application Priority Data

Dec. 9, 2011 (KR) ........................ 10-2011-0132259

(51) Int. Cl.
*B60W 10/06* (2006.01)
*B60W 30/19* (2012.01)

(52) U.S. Cl.
CPC ............. *B60W 30/19* (2013.01); *B60W 10/06* (2013.01); *B60W 2510/0638* (2013.01); *B60W 2540/14* (2013.01); *B60W 2710/0605* (2013.01); *B60W 2710/082* (2013.01); *B60Y 2400/71* (2013.01); *Y10T 477/80* (2015.01)

(58) Field of Classification Search
USPC .......................... 477/101, 107; 701/99, 101
See application file for complete search history.

(56) References Cited

U.S. PATENT DOCUMENTS

| | | | |
|---|---|---|---|
| 2001/0004722 A1* | 6/2001 | Kotwicki et al. ............... | 701/54 |
| 2005/0124460 A1* | 6/2005 | Iriyama ......................... | 477/107 |
| 2008/0119328 A1* | 5/2008 | Satou et al. .................. | 477/181 |
| 2010/0317487 A1* | 12/2010 | Cullen ................... | B60W 10/11 |
| | | | 477/107 |

* cited by examiner

*Primary Examiner* — Robert Hodge
*Assistant Examiner* — Stacey Fluhart
(74) *Attorney, Agent, or Firm* — Morgan, Lewis & Bockius LLP (57) ABSTRACT

A control method for shifting in a manual transmission vehicle may include sensing tip-out while the vehicle travels; operating a tip-out torque filter when the tip-out is sensed; determining whether a switch of a clutch of the vehicle is turned on; stopping fuel injection by stopping the tip-out torque filter when the switch of the clutch is turned on, and reducing rotation speed of an engine by controlling a throttle flap of the vehicle.

2 Claims, 8 Drawing Sheets

CONTROL METHOD FOR SHIFTING IN MANUAL TRANSMISSION VEHICLE

CROSS-REFERENCE TO RELATED APPLICATION

The present application claims priority to Korean Patent Application No. 10-2011-0132259 filed in the Korean Intellectual Property Office on Dec. 9, 2011, the entire contents of which is incorporated herein for all purposes by this reference.

BACKGROUND OF THE INVENTION

1. Field of the Invention

The present invention relates to a control method for shifting in a manual transmission vehicle, and more particularly, to a control method for shifting in a manual transmission vehicle that can reduce a clutch meet shock and tip-out jerk in shifting of the manual transmission vehicle.

2. Description of Related Art

Figure 1:
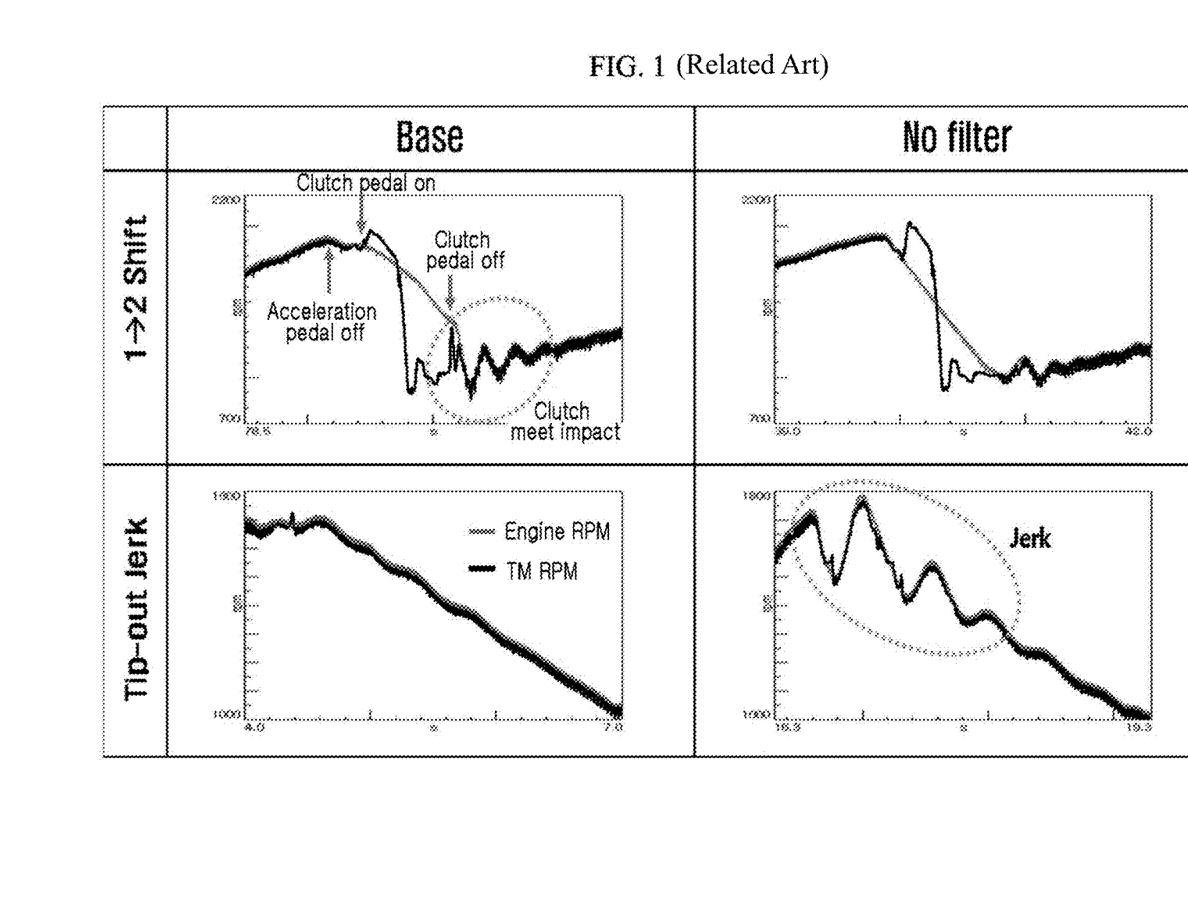
FIG. 1 is a graph showing a clutch meet shock and tip-out jerk in the related art.

In a common manual transmission vehicle, as shown in FIG. 1, when a small amount of fuel is supplied through a torque filter even after the acceleration pedal of a vehicle is released, it takes time to decrease the rotation speed (RPM) of the engine even if pressing down the clutch pedal for shifting. Therefore, a large difference is generated between the rotation speed of the engine and the rotation speed of the transmission, such that a shock is caused by clutch meet after shifting.

Fuel-cut may be immediately performed without a torque filter after the acceleration pedal is released, in order to prevent the clutch meet shock. Accordingly, the difference between the rotation speed of the engine and the rotation speed of the transmission decreases when the clutch operates for shifting, as shown in FIG. 1, such that the clutch meet shock is alleviated. However, in this case, when tip-in is converted into tip-out, the engine immediately stops injecting fuel (fuel cut) and the sign of the driving torque of the engine changes at that time, such that tip-out jerk is generated and the driver and the passengers feel unpleasant.

Figure 2:
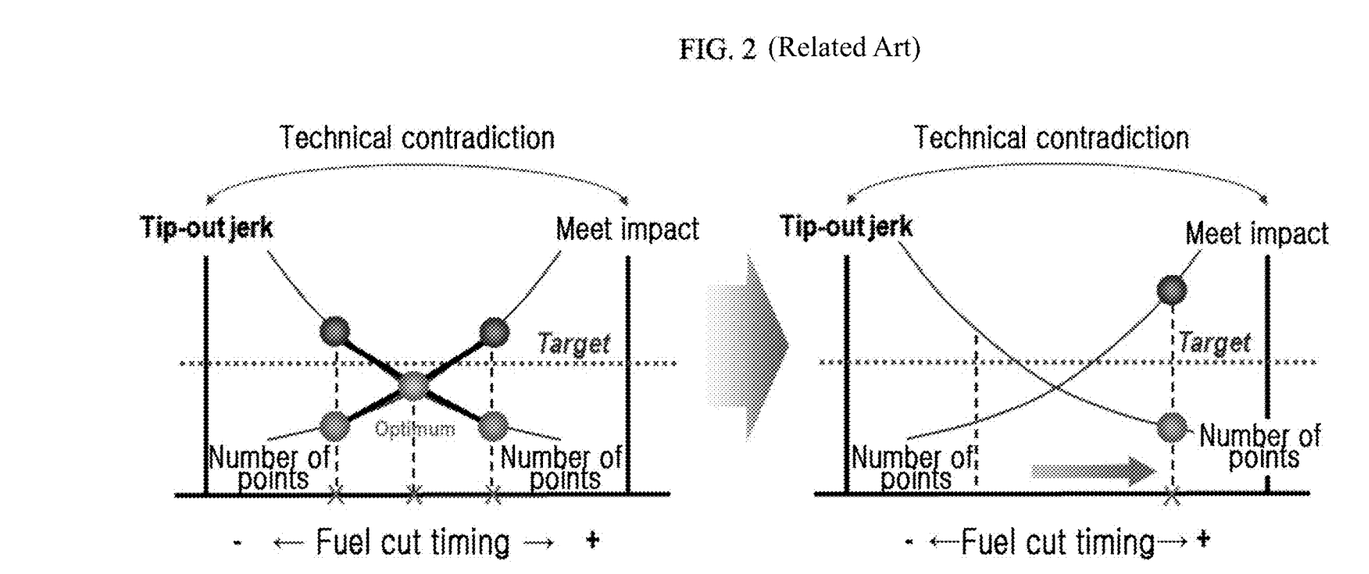
FIG. 2 is a diagram showing the contradictory relationship between a clutch meet shock and tip-out jerk.

Therefore, as shown in FIG. 2, there is a technical contradiction that it is difficult to solve both of the shock due to clutch meet and the tip-out jerk, therebetween. That is, when the fuel cut time is advanced to reduce the tip-out jerk, the clutch meet shock becomes worse, whereas when the fuel cut time is excessively extended to alleviate the clutch meet shock, the tip-out jerk is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for shifting in a manual transmission vehicle that can improve merchantability and reliability by reducing noise and vibration in the vehicle, by solving a physical contradiction between a clutch meet shock and tip-out jerk in shifting of the manual transmission.

In an aspect of the present invention, a control method for shifting in a manual transmission vehicle may include sensing tip-out while the vehicle travels, operating a tip-out torque filter when the tip-out is sensed, determining whether a switch of a clutch of the vehicle is turned on, stopping fuel injection by stopping the tip-out torque filter when the switch of the clutch is turned on, and reducing rotation speed of an engine by controlling a throttle flap of the vehicle.

The method may further include determining whether the rotation speed of the engine is less than a predetermined rotation speed by the control of the throttle flap.

The method may further include stopping the control of the throttle flap when the rotation speed of the engine is less than the predetermined rotation speed.

In the determining of whether the switch of the clutch is turned on, the tip-out torque filter is kept operating when it is determined that the switch of the clutch does not operate.

Therefore, the control method for shifting in a manual transmission vehicle according to an exemplary embodiment of the present invention has an effect capable of preventing tip-out jerk by allowing a small amount of fuel to be supplied by a tip-out torque filter under tip-out.

Further, the control method for shifting in a manual transmission vehicle according to an exemplary embodiment of the present invention has an effect capable of alleviating a clutch meet shock by improving reduction of rotation speed of the engine, by controlling the clutch switch with the tip-out torque filter.

In addition, there is an effect capable of reducing vibration and noise when shifting is completed, by inducing a smooth change in rotation speed of the engine by stopping the control of the throttle flap, when the rotation speed of the engine is less than a predetermined rotation speed.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described with reference to the accompanying drawing.

Figure 3:
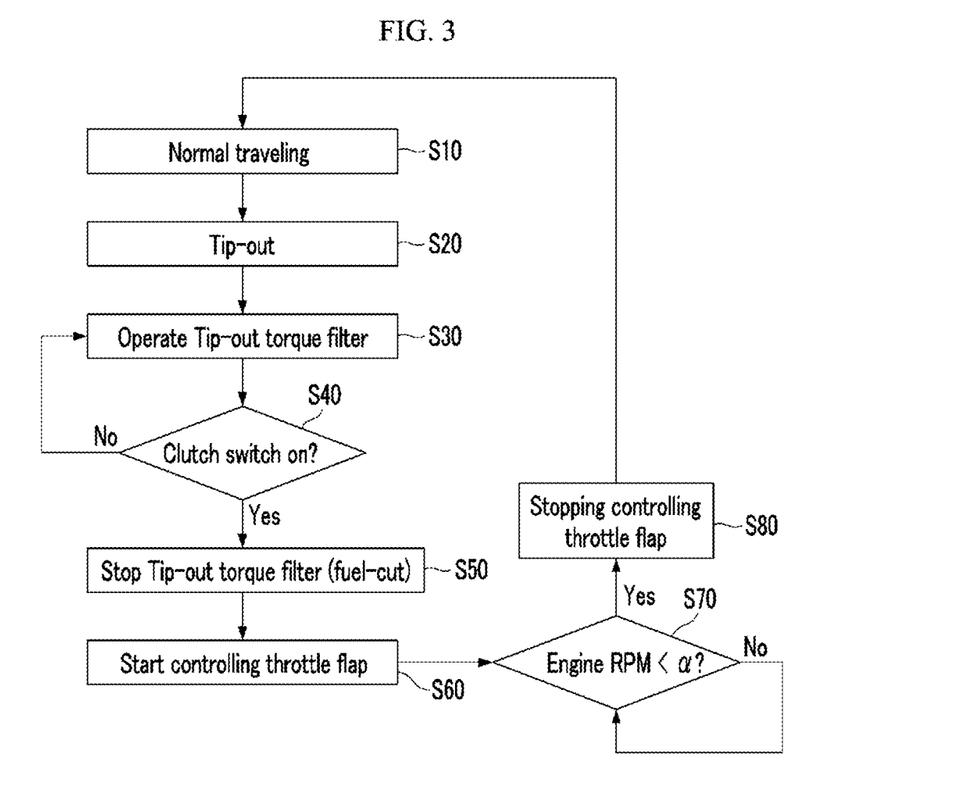
FIG. 3 is a flowchart of a control method for shifting in a manual transmission vehicle according to an exemplary embodiment of the present invention.

FIG. 3 is a flowchart of a control method for shifting in a manual transmission vehicle according to an exemplary embodiment of the present invention. As shown in FIG. 3, a control method for shifting in a manual transmission vehicle according to an exemplary embodiment of the present invention may include: sensing tip-out (reducing) (S20) while a vehicle travels (S10), operating a tip-out torque filter (On) when the tip-out is sensed (S30), determining whether a switch of a clutch 30 of the vehicle is turned on (S40), stopping fuel injection (fuel cut) by stopping the tip-out torque filter (Off) when the switch of the clutch 30 is turned on (S50), reducing the rotation speed of an engine (10) by controlling a throttle flap of the vehicle (S60), determining whether the rotation speed of the engine (10) is less than a predetermined rotation speed α by controlling the throttle flap (S70), and stopping controlling the throttle flap (Off) when the rotation speed of the engine 10 is less than the predetermined rotation speed α (S80).

Figure 4:
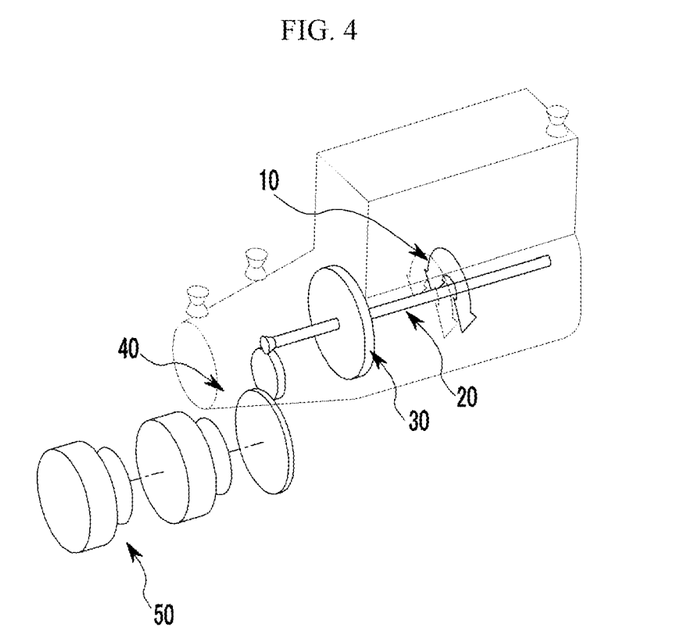
FIG. 4 is a diagram schematically showing the configuration of a power transmission where the control method for shifting in manual transmission vehicle according to an exemplary embodiment of the present invention is applied.

A power transmission of a vehicle to which the control method for shifting according to an exemplary embodiment of the present invention is applied, as shown in FIG. 4, is an apparatus transmitting power generated from the engine 10 to driving wheels, and may largely include: a clutch 30 that is disposed at a crankshaft flywheel 20 of the engine 10 and allows/cuts power transmission for starting or shifting, a transmission that changes engagement of a gear 40 to fit the travel states of the vehicle for forward/backward moving, and the gear 40 and a differential 50 that transmit power at an appropriate rotation speed to the left and right wheels when the vehicle turns while finally reducing the rotation speed of the transmission.

As shown in FIG. 3, a control unit of the vehicle senses whether tip-out is generated (S20) in a normal travel state (S10). In one or more exemplary embodiments, an ECU (Electric Control Unit) of a vehicle senses whether there is the tip-out on the basis of a signal transmitted from an accel position sensor.

When the tip-out is generated, the tip-out torque filter is operated (S30).

When the tip-out torque filter is converted to tip-out from tip-in and the engine 10 immediately stops (fuel cut) fuel injection, the sign of the driving torque of the engine 10 changes at that time and a shock is generated. In particular, in a vehicle equipped with a manual transmission, since the clutch 30 transmitting the driving force to the transmission is implemented by a spring mass, tip-out jerk is generated with a shock.

Therefore, in the control method for shifting in a manual transmission vehicle according to an exemplary embodiment of the present invention, tip-out jerk is prevented by allowing a small amount of fuel to be supplied by a tip-out torque filter under tip-out (S30).

Figure 5:
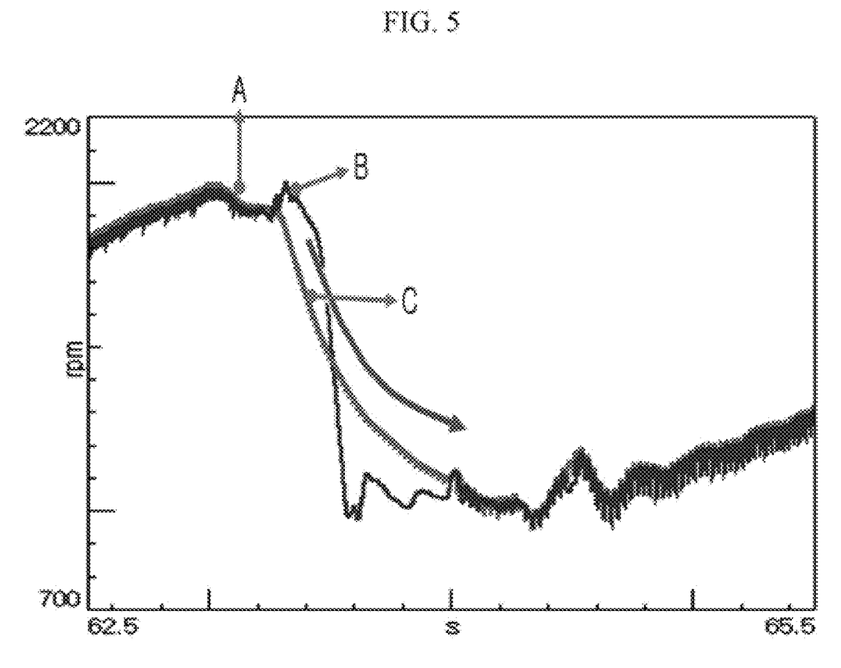
FIG. 5 is a graph showing an effect of the control method for shifting in manual transmission vehicle according to an exemplary embodiment of the present invention.

FIG. 5 is a graph showing the result of an experiment applying the control method for shifting in a manual transmission vehicle according to an exemplary embodiment of the present invention.

When tip-out is generated at the part A in FIG. 5, the tip-out torque filter operates (S30) and prevents tip-out jerk, such that there is an effect of reducing noise and vibration.

Next, it is determined whether a switch of the clutch 30 operates (ON) with the operation (S30) of the tip-out torque filter (S40). In one or more exemplary embodiments, the ECU of the vehicle can determine whether the switch of the clutch 30 operates (ON).

As shown in FIG. 3, whether the switch of the clutch 30 is operated is determined (S40) and when the switch of the clutch 30 has not been operated, the process returns to S30 such that the tip-out torque filter can keep operating. This is made by considering that a difference is generated between the time when tip-out of the vehicle is generated and the time when the operation (On) of the switch of the clutch 30 is recognized.

Meanwhile, when it is determined that the switch of the clutch 30 has been turned on in S40, the operation of the tip-out torque filter is stopped (Off) (S50). This is for preventing a shock that may be generated in clutch meet. When fuel is supplied to the tip-out torque filter under the tip-out with the acceleration pedal released, it takes time to decrease the rotation speed (RPM) of the engine 10 even if pressing down the clutch 30, such that a shock is generated in clutch meet. Therefore, in an exemplary embodiment of the present invention, when it is determined that the switch of the clutch 30 is turned on, a shock in clutch meet is alleviated by stopping the tip-out torque filter.

That is, it is possible to improve a shock due to clutch meet by stopping the tip-out torque filter in accordance with the operation of the switch of the clutch 30 (S40) such that fuel injection is stopped (fuel cut).

Meanwhile, as shown in FIG. 3, the rotation speed of the engine 10 is reduced by controlling the throttle flap of the vehicle with the operation (On) of the switch of the clutch 30 (S60).

As described above, the tip-out torque filter is provided with a function characteristic that can reduce a shock and jerk by controlling the ETC and the ignition timing, but when there is excessive filtering, a delay is generated and a dysfunction that does not satisfy the characteristics of a manual transmission may be caused.

Therefore, in the control method for shifting according to an exemplary embodiment of the present invention, the rotation speed of the engine 10 is rapidly reduced and the shock of clutch meet is minimized by controlling the throttle flap of the vehicle with the operation (On) of the switch of the clutch 30 (S60). Therefore, the delayed RPM downspeed is improved by the tip-out torque filter.

As shown in the experiment graph of FIG. 5, at the part B, the clutch meet shock is improved by controlling the tip-out torque filter to stop with the operation of the clutch 30.

Further, at the part C in FIG. 5, the clutch meet shock is minimized by rapidly reducing the rotation speed (RPM) of the engine 10 by controlling the throttle flap with the switch of the clutch 30.

Next, as shown in FIG. 3, the ECU of the vehicle determines whether the rotation speed of the engine 10 is less than a predetermined rotation speed α by controlling the throttle flap (S70).

When the rotation speed of the engine 10 is less than the predetermined rotation speed α, the control of the throttle flap is stopped (Off) (S80).

In S80, shifting is finished and the rotation speed of the engine 10 is made smoothly changed by stopping the control of the throttle flap (Off) before meeting the clutch 30 again. Therefore, there is an effect of improving a shift shock. After the control of the throttle flap is stopped, the process returns to S10 to implement the normal traveling.

Figure 6:
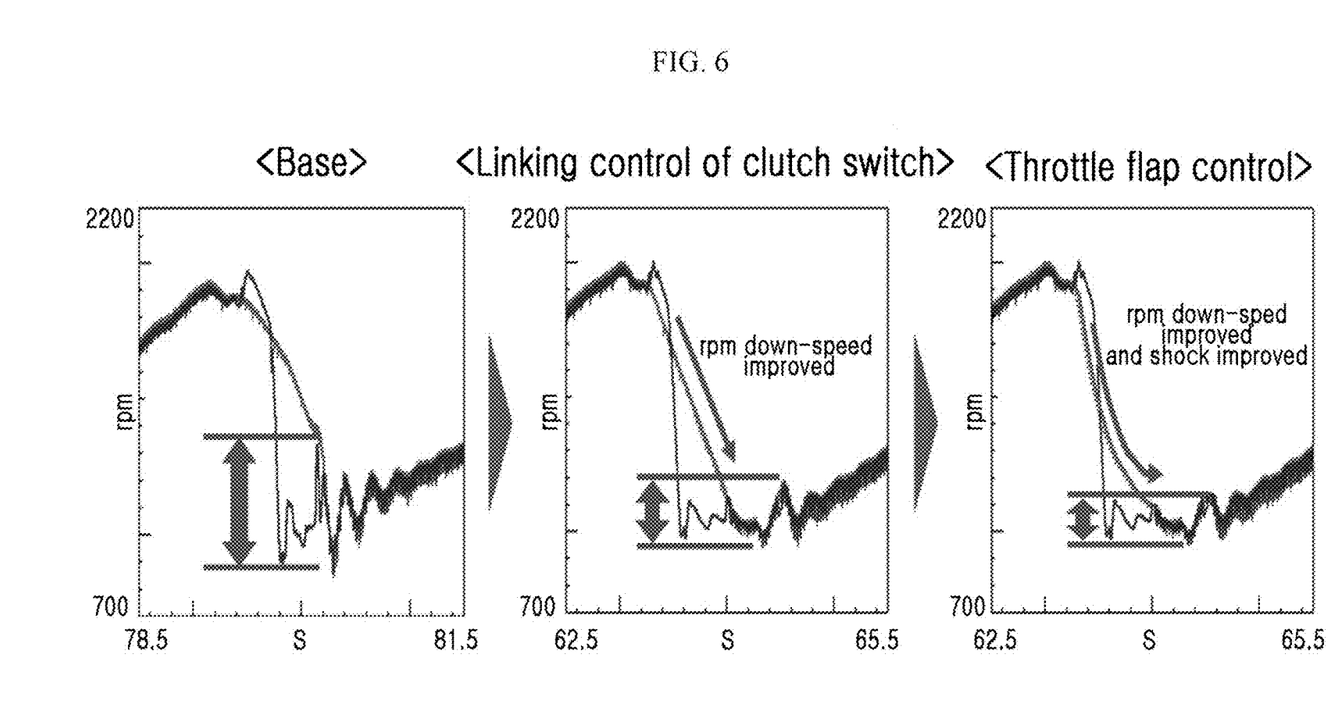
FIG. 6 is a diagram comparing a basic case with the effect of the control method for shifting in a manual transmission vehicle according to an exemplary embodiment of the present invention.

FIG. 6 sequentially shows from the left a basic case (Base), linking control of the switch of the clutch 30, and the control of the throttle flap.

As shown in FIG. 6, the reduction speed of the rotation speed of the engine 10 is improved in the linking control of the switch of the clutch 30, as compared with the basic case (Base), such that a clutch meet shock is alleviated. Further, the control of the throttle flap control is added to the linking control, such that the RPM down-speed is more improved and the clutch meet shock is minimized. In addition, when the rotation speed of the engine 10 is less than a predetermined rotation speed α, a smooth change in rotation speed of the engine 10 is induced by stopping (Off) the control of the throttle flap, such that vibration and noise are reduced when the shifting is completed.

Figure 7:
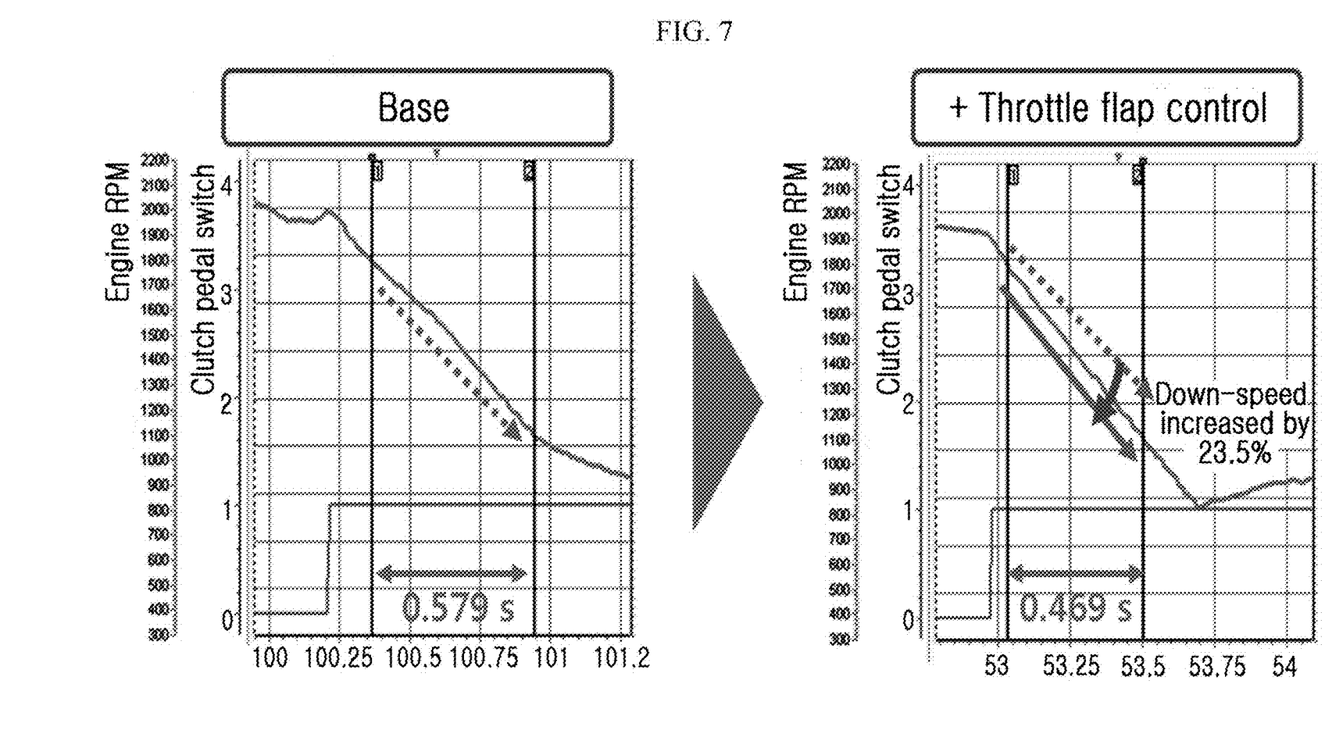
FIGS. 7 and 8 are graphs showing experiments when the control method for shifting in a manual transmission vehicle according to an exemplary embodiment of the present invention is actually applied to a vehicle.
Figure 8:
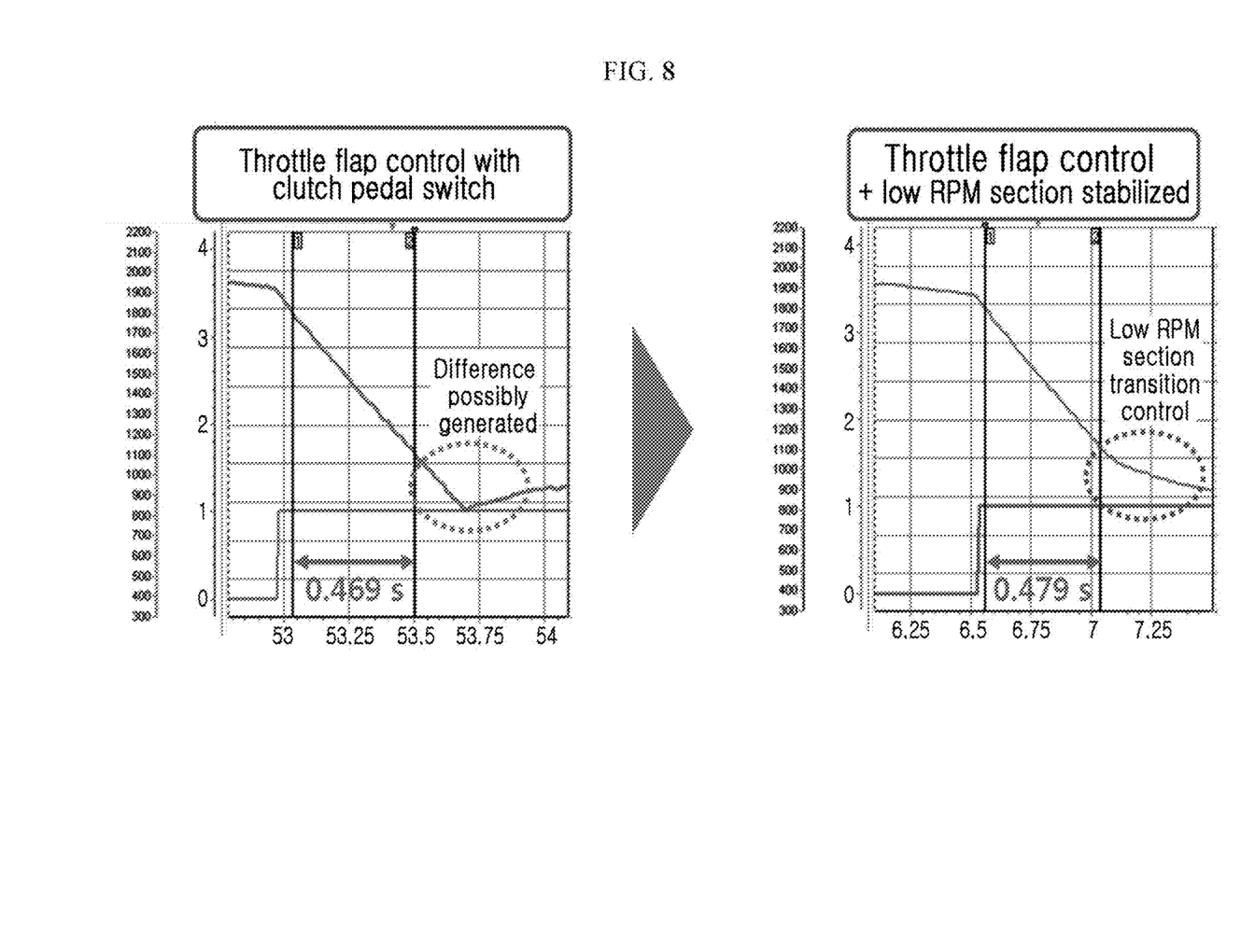

FIGS. 7 and 8 are graphs showing experimental results when the control method for shifting in a manual transmission vehicle according to an exemplary embodiment of the present invention is actually applied to a vehicle.

The graph shown in FIG. 7 is a graph relating to S10 to S60 of the present invention and shows a comparison of a basic case (Base) with an experiment that increased the RPM down-speed of the engine 10 by closing the throttle flap simultaneously recognizing a pedal switch of the clutch 30. In an exemplary embodiment of the present invention, it could be seen that the RPM down-speed of the engine 10 increased by 23.5% and a clutch meet shock could be reduced, as compared with when only fuel-cut was applied in the related art (Basae). That is, according to an exemplary embodiment of the present invention, it is possible to improve merchantability by improving a continued shock and generated vibration even though shifting is very quickly performed and the clutch 30 is operated.

Meanwhile, FIG. 8 shows a graph showing the result of an experiment relating to S70 and S80, in which the control of the related art that increases the RPM down-speed of the engine 10 by closing the throttle flap simultaneously with recognizing the pedal switch of the clutch 30 may cause a difference in a low RPM section when a stop section is not set, as shown at the left in FIG. 8. Therefore, according to an exemplary embodiment of the present invention, it was possible to make an RPM behavior smoother by stopping the control of the throttle flap right before meeting the clutch 30 again after shifting is finished, as shown at the right in FIG. 8, through S70 and S80.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for shifting in a manual transmission vehicle, comprising:
   sensing a tip-out while the manual transmission vehicle travels, wherein the tip-out corresponds to a release of an accelerator pedal of the vehicle;
   operating a tip-out torque filter when the tip-out is sensed;
   determining whether a switch of a clutch of the vehicle is turned on;
   stopping fuel injection by stopping the tip-out torque filter when the switch of the clutch is turned on;
   reducing rotation speed of an engine by controlling a throttle flap of the vehicle;
   determining whether the rotation speed of the engine is less than a predetermined rotation speed by the control of the throttle flap; and
   stopping the control of the throttle flap when the rotation speed of the engine is less than the predetermined rotation speed,
   wherein the manual transmission vehicle includes:
      a transmission configured to change engagement of a gear to fit travel states of the vehicle including forward and backward movement; and
      the clutch disposed at a flywheel of the engine and configured to allow and cut connection between the engine and the transmission for starting or shifting the gear.

2. The method of claim 1, wherein in the determining of whether the switch of the clutch is turned on, the tip-out torque filter is kept operating when it is determined that the switch of the clutch does not operate.

* * * * *